US012638196B2

(12) United States Patent　　　　(10) Patent No.:　US 12,638,196 B2

Jackson　　　　　　　　　　　　　(45) Date of Patent:　May 26, 2026

(54) SYSTEM FOR SUPPLYING ELECTRICITY, HEAT, AND WATER USING A STIRLING ENGINE POWERED BY SUSTAINABLE ENERGY SOURCES

(71) Applicant: Levar Jackson, Brooklyn, NY (US)

(72) Inventor:　Levar Jackson, Brooklyn, NY (US)

( * ) Notice:　Subject to any disclaimer, the term of this patent is extended or adjusted under 35 U.S.C. 154(b) by 0 days.

(21) Appl. No.: 18/223,530

(22) Filed:　Jul. 18, 2023

(65)　　　　Prior Publication Data

US 2026/0036310 A1　　Feb. 5, 2026

Related U.S. Application Data

(60) Provisional application No. 63/390,000, filed on Jul. 18, 2022.

(51) Int. Cl.
| | |
|---|---|
| *F24F 5/00* | (2006.01) |
| *F01K 13/00* | (2006.01) |
| *F02G 1/043* | (2006.01) |
| *F03G 4/00* | (2006.01) |
| *F03G 6/00* | (2006.01) |
| *F03G 6/06* | (2006.01) |

(52) U.S. Cl.
CPC ............ *F24F 5/0046* (2013.01); *F01K 13/00* (2013.01); *F02G 1/043* (2013.01); *F03G 4/037* (2021.08); *F03G 6/0055* (2021.08); *F03G 6/068* (2013.01); *F02G 2254/30* (2013.01); *F03G 4/063* (2021.08); *F24F 2005/0053* (2013.01); *F24F 2005/0064* (2013.01)

(58) Field of Classification Search
CPC ........ F02G 1/043; F02G 2254/30; F01K 3/00;

F01K 13/00; F03G 4/063; F03G 6/071; F03G 6/0055; F03G 6/068; F03G 4/037; F24F 5/0046; F24F 2005/0053; F24F 2005/0064

See application file for complete search history.

(56)　　　　References Cited

U.S. PATENT DOCUMENTS

| | | | | |
|---|---|---|---|---|
| 3,956,895 | A * | 5/1976 | Noble | F02G 1/053 60/516 |
| 5,272,879 | A * | 12/1993 | Wiggs | F01K 25/08 60/671 |
| 5,899,071 | A * | 5/1999 | Stone | F03G 6/00 60/641.8 |
| 11,480,160 | B1 * | 10/2022 | Mokheimer | F03G 4/001 |
| 2006/0137349 | A1 * | 6/2006 | Pflanz | F03G 6/045 60/641.2 |
| 2009/0205636 | A1 * | 8/2009 | Gangemi | F24S 23/75 126/573 |
| 2012/0085093 | A1 * | 4/2012 | Kim | F28D 20/0052 60/641.8 |
| 2013/0299123 | A1 * | 11/2013 | Matula | F24F 5/005 165/45 |
| 2014/0174080 | A1 * | 6/2014 | Friesth | F01K 3/00 60/516 |
| 2018/0112625 | A1 * | 4/2018 | Wood | F02G 1/0435 |
| 2019/0093641 | A1 * | 3/2019 | Sumrall | F03G 7/04 |

* cited by examiner

*Primary Examiner* — Matthew T Largi

(57)　　　　ABSTRACT

An interior space climate control system featuring a temperature differential engine, with the temperature differential engine configured to exploit the temperature differential of at least two sources with different temperatures. The fluids may be used to provide additional benefits to an interior space, such as heating, hot water, cooling, and refrigeration, and unused climate control fluids may in turn be used as sources of fluids with temperature differentials.

20 Claims, 4 Drawing Sheets

SYSTEM FOR SUPPLYING ELECTRICITY, HEAT, AND WATER USING A STIRLING ENGINE POWERED BY SUSTAINABLE ENERGY SOURCES

PRIORITY CLAIM

This non-provisional application claims priority to and the benefit of provisional application No. 63/390,000, filed Jul. 18, 2022, which is incorporated herein as if restated in full.

SUMMARY

The system described herein is designed to satisfy the electricity, hot water, and climate control demands of a building or complex interior, such as inside a hotel, house, mall, office building, industrial center, greenhouse, apartment, apartment complex, or any other interior location. The satisfaction of the above resources is provided via an electrical generator, such as a Stirling engine, coupled to sustainable/replenishable energy sources. A further objective is to eliminate (or at least, vastly reduce) the need to burn fuel, such as oil, gas, or wood, in order to generate the heat, hot water, and electricity required for a functional and comfortable interior space. In addition to the purification of localized air and the reduction in global carbon emissions, the reduction in the use of fuel effects a decrease in dependency on malign and/or opposing geopolitical entities. Such a decrease of dependence increases supply resilience and self-sufficiency, both on a local and national level.

In addition to interior spaces, the system may also be designed to satisfy the demands of exterior spaces, such as backyards, courtyards, roads, pools, driveways, bridges, or ice skating rings, etc. While the need for electricity is ubiquitous, it is less recognized that exterior spaces also have climate control requirements. Pools, for example, may need their temperature controlled in order to facilitate a comfortable swim. Roads may need to be heated in order to prevent the accumulation of snow or ice-most pertinently and feasibly on driveways which are arduous to clear and which do not benefit from the plowing power of dedicated vehicles, but also on both local roads and highways. Courtyards and backyards may utilize heating for outdoor events, particularly when previously scheduled events, such as wedding ceremonies, wedding receptions, or other parties, fall on days which turn inclement. Ice skating rings certainly require cooling at the level of the ground in order to preserve the integrity of the ice, but these could also benefit from a stream of warm air above in order to free ice skaters of the need for winter-wear.

Finally, while the system is intended first and foremost to provide for the needs of a given interior or exterior space, it may also be used to provide for a surrounding community. Excess hot water, heat, cool air, and electricity not used for the former may be channeled toward the latter. With the occurrence of a multiplicity of such systems, each system may have a reciprocal relationship with other systems, such that what is lacking in the former may be supplied by the latter, and so on. The multiplicity of the system is particularly germane when a community is situated, physically, on land of various altitudes, with some portions of the community closer to one or more bodies of water, hot springs, forests, etc.

The system ideally utilizes a Stirling engine, which is capable of generating electricity by exploiting a temperature differential. The temperature differential may be actuated via natural sources of varying temperatures. The Stirling engine may be in mechanical, electrical, and physical proximity and engagement with one or more opposing temperature sources, as will be described.

The Stirling engine may be what is conventionally termed an "alpha engine", which features two pistons, with each operating in its own cylinder and on opposite sides of a series comprising a cooler, a regenerator, and a heater, with a first piston and cylinder providing compression and a second piston and cylinder providing expansion.

The Stirling engine may alternatively be in the form of a "beta engine", which utilizes a single piston and a displacer operating in a single cylinder, with the displacer configured to transfer gas across the cooler, regenerator, and heater. The piston and displacer may undergo reciprocating alternative movement. The beta engine may feature a mechanical linkage system, such as a crank, or may instead feature a free piston configuration with a linear alternator. The displacer may be magnetically controlled.

The beta Stirling engine is another variation of the Stirling engine design. It is named after the Greek letter "B" (beta) due to its configuration. The beta engine is a closed-cycle, external combustion engine that operates on the Stirling thermodynamic cycle.

The beta Stirling engine typically consists of two cylinders, a hot cylinder, and a cold cylinder. Both cylinders are connected to a common displacer cylinder. The displacer cylinder contains a movable piston called the displacer, while the hot and cold cylinders contain the power piston.

The beta Stirling engine utilizes a working fluid, often a gas such as helium, hydrogen, or air. The working fluid undergoes cyclic compression and expansion as it moves between the hot and cold spaces. The displacer is driven by a mechanism such as a crankshaft or a phase-shifting mechanism. The displacer moves back and forth between the hot and cold spaces, transferring the working fluid between the two spaces. The hot cylinder is externally heated, typically by a burner or concentrated solar energy. As the working fluid moves into the hot space, it expands and pushes the power piston outward.

In a beta Stirling engine the outward movement of the power piston is converted into rotary motion through a connecting rod and crankshaft arrangement. This rotary motion can be used to drive mechanical devices or generators. As the displacer moves toward the cold space, the working fluid is transferred into the cold cylinder. In the cold space, the working fluid cools down, causing it to contract and the power piston to move inward. Once the working fluid has cooled in the cold cylinder, the displacer moves back toward the hot space, transferring the working fluid back into the hot cylinder. This completes the cycle, and the process repeats itself as the hot cylinder is heated again.

The beta Stirling engine offers advantages such as good thermal efficiency and low vibration due to the separate hot and cold cylinders. It is often used in applications where compact size and quiet operation are desired.

The Stirling engine may yet again alternatively constitute a "gamma engine", which, like a beta engine, features a displacer and a single piston, but disposes the displacer and the single piston in separate cylinders.

The gamma Stirling engine is one of the variations of the Stirling engine design. It is named after the Greek letter "γ" (gamma) due to the shape of its configuration. The gamma engine is a closed-cycle, external combustion engine that operates on the Stirling thermodynamic cycle.

The gamma Stirling engine consists of two cylinders, typically arranged in a V-shape. One cylinder is referred to as the hot cylinder, and the other is the cold cylinder. The two cylinders are connected by a regenerator and a heat exchanger. The engine uses a working fluid, often a gas such as helium, hydrogen, or air. The working fluid undergoes cyclic compression and expansion as it moves between the hot and cold cylinders.

The gamma Stirling engine relies on heat transfer to operate. The hot cylinder is heated externally, usually through a heat source such as a burner or concentrated solar energy. The heat causes the working fluid in the hot cylinder to expand, pushing the piston outward. As the piston in the hot cylinder moves outward, it pushes the working fluid into the regenerator. The regenerator is a matrix of porous material that stores heat during one phase of the engine cycle and releases it during another, improving the overall efficiency. The working fluid then moves from the regenerator to the cold cylinder. As it enters the cold cylinder, it cools down, causing it to contract and the piston to move inward.

In the gamma Stirling Engine, the movement of the pistons in the hot and cold cylinders is linked to a connecting rod, which drives a crankshaft to generate rotary motion. This rotary motion can be used to drive a generator, pump, or other mechanical devices. Once the working fluid has cooled and contracted in the cold cylinder, it is transferred back to the hot cylinder, completing the cycle. The process then repeats itself as the hot cylinder is heated again, and the engine continues to operate.

The gamma Stirling engine is known for its smooth and vibration-free operation. It can achieve high energy efficiency, especially when coupled with heat sources like solar or waste heat.

The renewable sources coupled to the Stirling engine may be naturally occurring phenomena which may be exploited for their heat, motion, or other forms of energy. These sources may include hydropower, biomass, wind, geothermal, and solar.

Hydropower constitutes the conversion of mechanical energy, via a turbine, into electrical energy. Generally, the mechanical energy portion of hydropower is obtained by exploiting aquatic motion-usually the falling motion but also conceivably the swirling or eddying motion-of water. However, it is also possible to derive energy from a body of water, not through its motion but through its temperature difference with another material, including another body of water. Because water tends to retain its temperature due to its high volumetric heat capacity, it often differs in temperature from the adjacent ambient air that resides above it. Additionally, water may be found in the form of subterranean rivers (which run beneath the ground surface), subterranean pools, and aquifers—the latter of which exists as a body of porous rock saturated with water. Such subterranean water is shielded perpetually from the heat of the sun and may magnify the temperature difference with ambient air. While subterranean rivers, pools, and aquifers are naturally occurring, they may also be artificially constructed. The system described herein conceives of the exploitation of all of these water bodies as portions of the temperature differential to be utilized by the Stirling engine.

Biomass, which is essentially chemical energy derived from the sun via photosynthesis and stored in plant matter, is renewable, but it is not sustainable because the plants used, such as trees, are a crucial to almost all ecosystems and play a vital role in capturing atmospheric carbon dioxide through respiration. Additionally, as the system described herein is mainly concerned with exploiting renewable and sustainable sources for their temperature differentials to generate electricity using a Stirling engine, biomass is not a preferred part of the system.

Like hydropower, wind power constitutes the conversion of mechanical energy, via a turbine, into electrical energy; however instead of using the motion in bodies of water, wind power relies on the motion of air. Again, similarly to hydropower, it is possible, at least theoretically, to exploit the temperature differential of thermal winds. Warm air rises toward a higher altitude, whence it cools and descends—this is the natural causation of wind. Since the temperature of the air changes with altitude, it is not seemingly practical to exploit the temperature difference thereof, because the temperature of warm air in one current and cold air in another current would equalize as they approach a common altitude—i.e., the altitude of the Stirling engine. However, if a technique is found to exploit the temperature difference here, not for the purpose of creating wind for generating electricity via a turbine but for the temperature difference itself, then the present system can be modified to accommodate it.

Geothermal energy originates in the formation of the planet, and is essentially the heat trapped beneath the mantle. Additionally, it is commonly caused by the radioactive decay of various forms of matter beneath the surface.

Geothermal heat is most easily accessed via the coremantle boundary along the meeting points of tectonic plates. As such, geothermal energy is largely a regional phenomenon, and certain countries have very little access to geothermal heat at all. In the regions which do have geothermal heat, it commonly manifests in the form of hot springs—or volcanoes. Nevertheless, it is possible for regions which do not reside along the edges of tectonic plates to access geothermal energy via drilling, although drilling does carry some risk of inducing a seismic response (i.e., an earthquake).

A less intense but more prevalent form of geothermal energy is the temperature differential between the atmospheric air and the ground (and just below the ground), in which the ground tends to have a higher temperature than the surrounding air during the winter season, but a lower temperature than the surrounding air during the summer season. This form of geothermal energy is utilized by the system in the form of geothermal wells, as will be discussed.

While nuclear power does not generally contribute to global carbon emissions, it does produce undesirable waste in the form of radioactive material, which is hazardous and must be cautiously and securely stored in dedicated repositories via a vitrification process. Not only must the byproduct of fission be properly disposed of, but so too must incidental materials, such as tools, work clothing, and other items in continuous or close proximity to the reactor. In addition, powerplants are enormous facilities that should not be in proximity to the interior or exterior places or surrounding communities previously mentioned. For these reasons, the system described herein does not explicitly discuss the incorporation of nuclear power as an energy source.

The Stirling engine may exploit the temperature difference of opposing temperature sources in order to generate electricity. Opposing temperature sources may include high temperature sources, middle temperature sources, and low temperature sources. These terms are relative, in that a high temperature source is high with respect to a middle temperature source or a low temperature source, a middle temperature source is higher than a low temperature source, etc.; however, the relative differences in temperature enable the Stirling engine to operate, and the greater the relative difference, the greater the efficacy of the Stirling engine. Thus, engaging the Stirling engine with both a high temperature source and a low temperature source will yield a higher efficacy than a high temperature source and a middle temperature source, or a middle temperature source and a low temperature source. However, as high or low temperature sources are not always available, a middle temperature source, even in conjunction with another but higher or lower middle temperature may still enable the Stirling engine to operate.

The system may be configured to utilized multiple temperature sources having a common temperature zone—for example, one high temperature source may be in the form of a gas while another high temperature source may be in the form of a liquid.

High temperature sources may include the heat captured via a solar heat collector. The solar heat collector may be of the passive type or the active type, with the passive type configured to receive the heat and energy from the sun, but not to collect or direct. Thus, placing the Stirling engine in a position, such as outside, where it is most likely to directly receive solar radiation, operates as a passive heat collection of sorts. The Stirling engine can be constructed so that its hot temperature intake is disposed on a top portion and therefore best situated to absorb solar radiation. However, the technology described here preferably conceives of an at least an active heat collector, in which heat is collected by a fluid, such as a gas or liquid, which is then directed via pipes, ducts, fans, and/or pumps to the high temperature intake of the temperature exchange of the Stirling engine. The fluid is reused by being redirected via fans and pumps back toward the main body of the heat collector in order to continue absorbing solar radiation.

In a simple configuration, fluid flow is continuous, and flows uninterruptedly from its solar radiation position to the Stirling engine's high temperature intake and back again. The disadvantage of this configuration may be that the fluid, even if it travels slowly, does not have enough time to fully absorb the solar radiation, and therefore the energy directed at powering the fans and/or pumps is wasted and the temperature difference between the high temperature and low temperature intake of the Stirling engine may be modest. In a more advanced configuration, fluid flow is stayed at the solar radiation absorption position for a designated period of time, and then released on its track to the high temperature intake in batches. This designated period of time may be set manually, or determined in real-time based on the temperature of the fluid as detected via sensors.

In one variation, the solar heat collector is coupled to a set of mirrors disposed on a building's exterior or otherwise surrounding the solar heat collector. The mirrors may operate as a solar heat trap by tracking and reflecting light directly toward the solar heat collector in order to magnify the solar radiation. The tracking may be achieved via ball-in-socket or other spherical rotation mechanisms in connection with a sensor array to detect the solar intensity vis-à-vis the angle of each mirror and an electro-mechanical controller to change the angle of the mirrors to enable the greatest provision of reflective solar radiation toward the solar heat collector.

The solar heat collector may be disposed on the roof of the building or a roof of a dedicated facility, with the dedicated facility connected to or adjacent to the building for which electricity, climate control, hot water, and/or refrigeration is desired. In one variation, a set of solar heat collectors are used, with each solar heat collector disposed in a different location and having a different configuration, with the differences in location and configuration intended to exploit different positions of the sun based on the season and/or throughout the day.

As it is not always desirable for the Stirling engine to be running due to changing demands for electricity or the capacity for storage thereof, the heated fluid may be stored in a thermally sealed storage tank until it is needed. Additionally, unused heated fluid may be diverted toward the building to supply its heat or hot water. The heated fluid, if in the form of water, may be used directly as a hot water supply in the building, but this may require an onerous use of filtering techniques which would otherwise be unnecessary for the heat collector and Stirling engine coupling. Instead, the heated fluid may be used to supply heat to a second body of (potable) water. This transfer of heat may occur via proximity and a non-permeable, non-thermally insulated divider.

Ideally, the heated fluid will be used to provide space heating. This space heating may occur via a network of pipes or ducts and exposures, with the pipes or ducts disposed in the floor and walls for radiant heating and the exposures positioned strategically to allow the heated fluid to warm the air without permitting direct contact between the heated fluid and residents or visitors of the building. The exposures may comprise vents, openings, permeable barriers, etc., and may be disposed on the pipes or ducts, on the floor, walls, or ceiling, or on dedicated exposure apparatuses. The exposures may be combined with pumps or fans to propel the movement of the fluid into the air.

A geothermal well may act as, alternatively, a high, medium, or low temperature source. As a low temperature source, the geothermal well may maintain the cool temperature of a fluid, such as a gas or liquid, obtained during the night or from a cold source, such as the ocean, a river, or a lake. As a medium temperature source, the geothermal well may maintain the medium temperature of a fluid obtained during the day. As a high temperature source, the geothermal well may maintain the high temperature of a fluid obtained from geothermal vents or baths, naturally occurring steam, the run-off of industrial processes, or the like. The geothermal well may comprise a naturally or synthetically thermally sealed tank, container, or hole, with the well being ideally placed underground in order to separate it from the ambient temperature above-ground.

The well may feature channels, such as pipes, ducts, or tunnels, for conveying fluid to the Stirling engine or other desirable location. Conveyance may occur passively, as occurs with warm air currents against cold air, (i.e., rising), or actively via pumps and fans. The well may feature openings, including permanent openings such as holes in the ground exposed to the air above, and controlled openings, such as windows, doors, gates, and panels capable of being opened and shut. Mechanisms for controlling the configuration of the openings may include manual components, such as handles, levers, locks, hinges, sliding frames, and the like. Mechanisms may also include automatic or processor assisted components, such as a relay systems, programs, and sensors. Sensors may be configured to detect such facts as: whether the openings are open or closed, the difference between the temperature inside the well and the temperature in the ambient air, of the occurrence of day or night, the degree of light intensity, etc. Programs may receive and analyze parameter data detected by the sensors to determine whether to open or close the openings, or to receive commands from a user to the same effect. Relay systems may control the mechanical parts previously described based on programmatic commands. The relay systems may operate electrically and/or wirelessly. These systems enable the optimal use of the geothermal well in order to obtain and maintain cool or hot fluid, as desired.

In addition to providing high, medium, or low temperature fluids to the Stirling engine, excess fluid may be used to assist in an interior's climate control (heating or air conditioning), hot water, or refrigeration. Fluid from the geothermal well may utilize a portion of the network of pipes or ducts and exposures described previously for the heated fluid obtained via the solar heat collector, or it may have its own dedicated network. The well may share the network with the solar heat collector when the fluid being used is a high temperature fluid, but may utilize a separate network for cold temperature fluid. In addition, the cold temperature fluid may be used to provide refrigeration.

In one embodiment, a plurality of geothermal wells or other storage vessels may be used in order to have long-term reserves of high, medium, and low temperature fluids of gas or liquid. Thus, one geothermal well may be dedicated to storing cold air captured during the night, a second may be dedicated to storing cold water captured from a river, lake, or the ocean, a third may be dedicated to storing heated fluid obtained from the solar heat collector, a fourth may be dedicated to storing warm captured during the day, and so on. If the system comprises multiple sources for a common temperature zone, the fluid obtained from those sources may be merged before being channeled to the Stirling engine, and/or may similarly be merged before being directed toward the network for interior/exterior use. In one variation, separate networks exist for gas and liquid fluids, even if they share a common temperature zone. This may be primarily to enable the passive conveyance of warm or hot air upwards, but may also be directed at specializing the fans, pumps, pipes, and/or vents for a particular fluid state and temperature zone.

As mentioned, excess heat derived from the solar heat collector or from a geothermal source, such as warm or hot air stored in the geothermal well, when not used for electrical generation, may instead be diverted toward providing heat or hot water to the interior (or exterior) of the building. Similarly, excess cool fluid, derived from cool air stored in a geothermal well or a body of water, when not used for electrical generation, may instead be diverted toward providing air conditioning or refrigeration. A reversal of this process is also conceived by the system-namely, cool fluid incompletely used in refrigeration or air conditioning and hot fluid incompletely used in heating or uses as hot water may be directed toward the Stirling engine to facilitate electrical production. This reverse flow may take place across the same network from which the flow originated, or may occur via a dedicated reverse network in order to prevent contamination.

In one variation, in lieu of a Stirling engine, a free piston engine is used for electrical generation. A free piston engine is an internal combustion engine design that does not use a traditional crankshaft mechanism to convert reciprocating motion into rotary motion. Instead, it utilizes the movement of pistons to directly generate power. In a free piston engine, the pistons are not physically connected to a crankshaft or any other mechanical linkage.

The basic working principle of a free piston engine involves the back-and-forth motion of the pistons within cylinders. As fuel and air are injected into the combustion chamber, it ignites and expands, driving the pistons away from the combustion chamber. This movement compresses the air or gas in the opposite cylinder, which acts as a compressor. The pistons then reverse direction and move back toward the combustion chamber, pushing out exhaust gases and drawing in a fresh mixture of fuel and air.

Free piston engines often use linear generators, which convert the reciprocating motion of the pistons into electricity. The generated electrical power can be used to drive various applications, such as electric propulsion, power generation, or other industrial processes.

One of the advantages of free piston engines is their potential for high efficiency. They can optimize the combustion process, offering better control over factors such as compression ratio and ignition timing. Additionally, their simple design and fewer moving parts can result in reduced maintenance and increased reliability. Free piston engines are also flexible in fuel options, as they can be designed to run on various fuels, including gasoline, diesel, natural gas, or even alternative fuels.

DETAILED DESCRIPTION OF THE DRAWINGS

Figure 1:
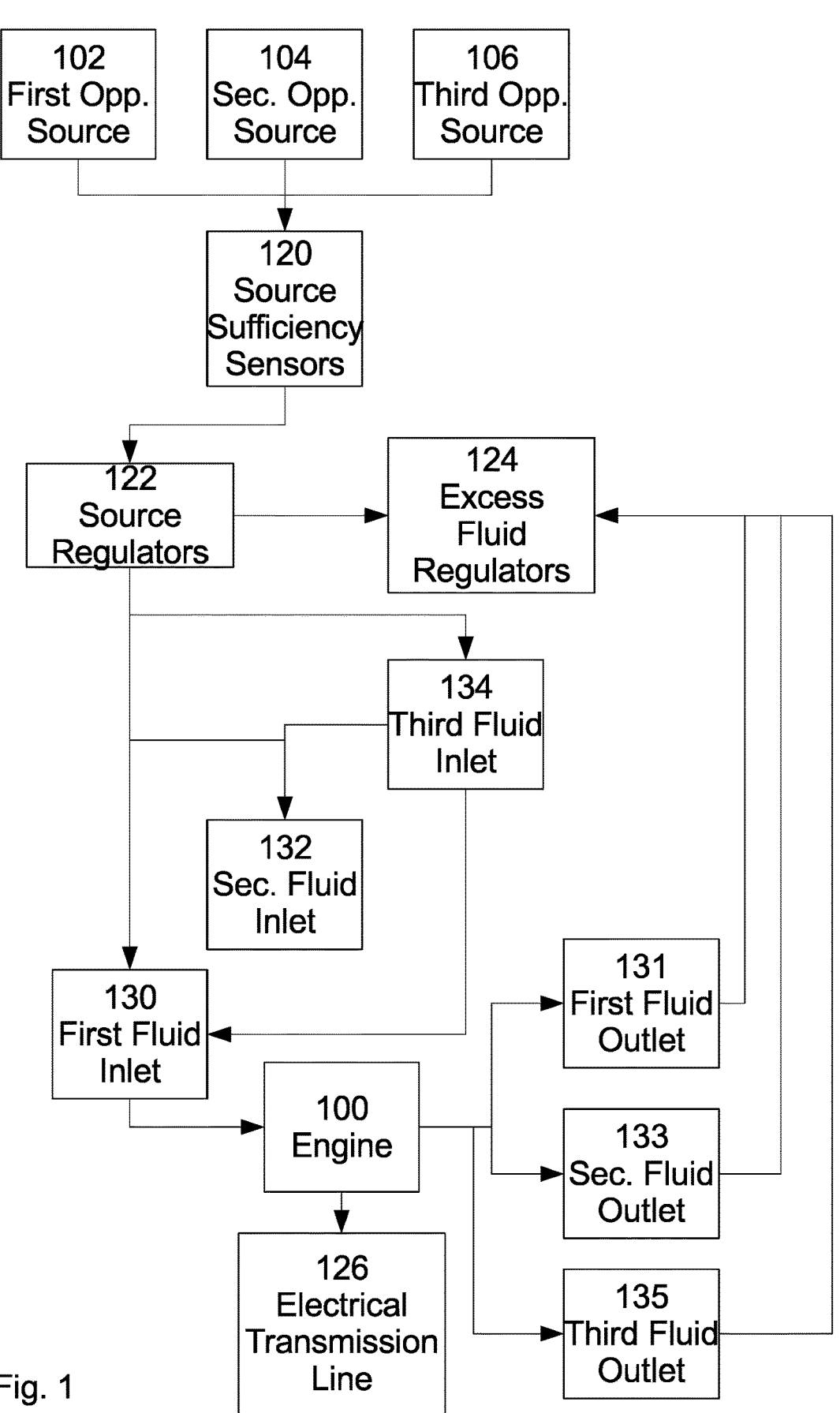
FIG. 1 shows an exemplary climate control and electrical generation system.
Figure 2:
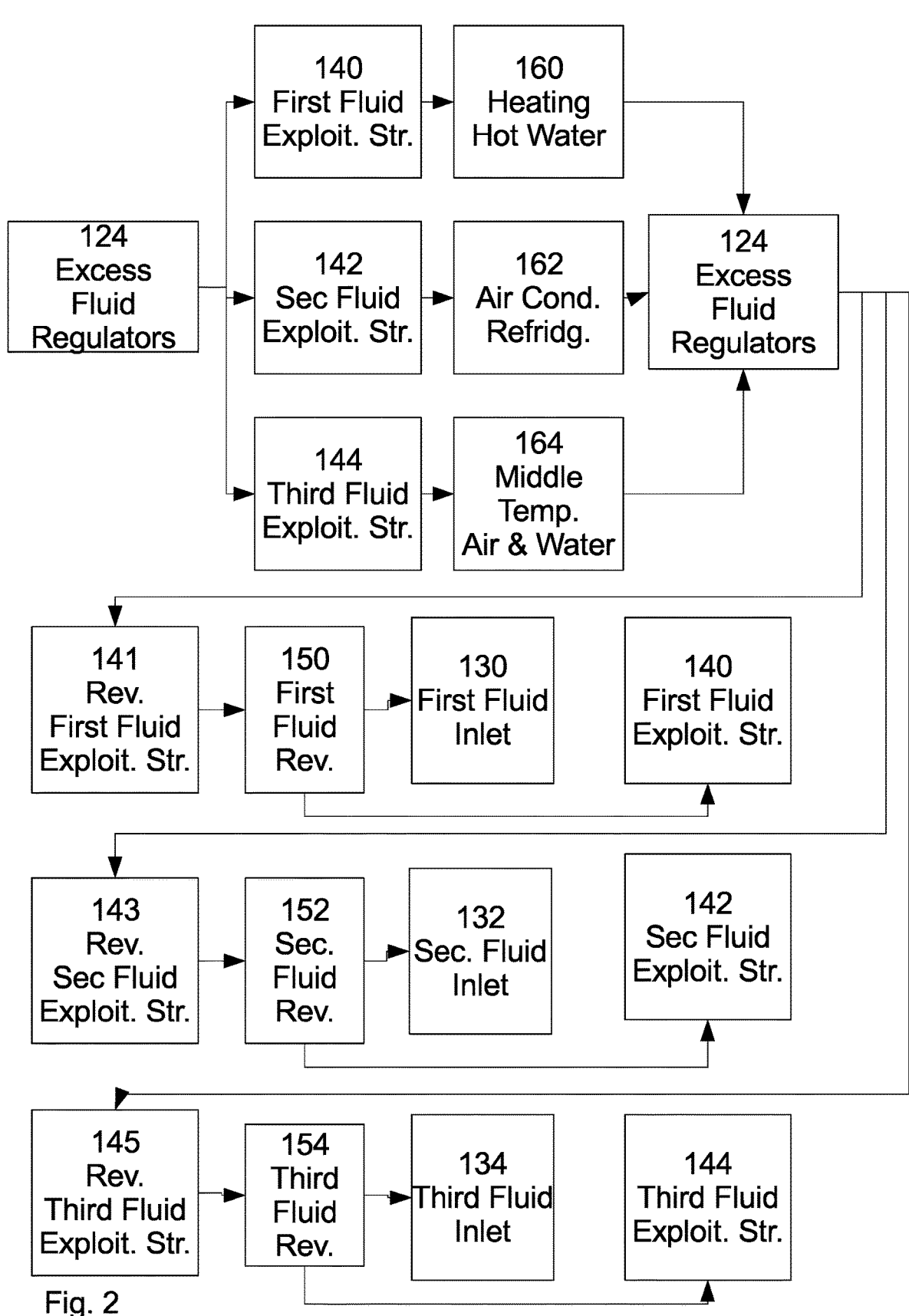
FIG. 2 shows an exemplary climate control and electrical generation system.

FIGS. 1-2 show an interior space climate control system comprising a temperature differential engine 100, a first opposing temperature source 102, a second opposing temperature source 104, a third opposing temperature source 106, source sufficiency sensors 120, source regulators 122, excess fluid regulators 124, an electrical transmission line 126, a first fluid conveyance inlet 130, a first fluid conveyance outlet 131, a second fluid conveyance inlet 132, a second fluid conveyance outlet 133, a third fluid conveyance inlet 134, a third fluid conveyance outlet 135, a first fluid flow exploitation stream 140, a reverse first fluid flow exploitation stream 141, a second fluid flow exploitation stream 142, a reverse second fluid flow exploitation stream 143, a third fluid flow exploitation stream 144, a reverse third fluid flow exploitation stream 145, a first fluid reservoir 150, and a second fluid reservoir 152.

The first fluid conveyance inlet 130 is configured to convey a first fluid from the first opposing temperature source 102 into the temperature differential engine 100 and the first fluid conveyance outlet 131 is configured to convey the first fluid out of the temperature differential engine 100. The second fluid conveyance inlet 132 is configured to convey a second fluid from the second opposing temperature source 104 into the temperature differential engine 102 and the second fluid conveyance outlet 133 is configured to convey the second fluid out of the temperature differential engine 102. The third fluid conveyance inlet 134 is configured to convey a third fluid from the third opposing temperature source 106 into the temperature differential engine 102, and the third fluid conveyance outlet 135 is configured to convey the third fluid out of the temperature differential engine 102.

The source sufficiency sensors 120 are configured to determine if there is sufficient fluid flow or volume in the first or second opposing temperature sources. The source regulators 122 are configured to direct the third opposing temperature source to replace the first opposing temperature source if the source sufficiency detector determines that fluid flow in the first opposing temperature source is less than a given first fluid flow volumetric or temperature threshold.

The source regulators are configured to direct the third opposing temperature source to replace the second opposing temperature source if the source sufficiency detector determines that fluid flow in the second opposing temperature source is less than a given second fluid flow volumetric threshold or greater than a given second fluid flow temperature threshold.

The source regulators may divert the third fluid from the third fluid flow conveyance inlet to the first or second inlet.

The excess fluid regulators 124 are configured to direct excess fluid from the first fluid to the first fluid flow exploitation stream 140, with the first fluid flow exploitation stream providing fluid for heating and hot water 160 in an interior space.

The excess fluid regulators are configured to direct excess fluid from the second fluid to the second fluid flow exploitation stream 142. The second fluid flow exploitation stream is configured to provide cooling fluid for use in refrigeration and air conditioning 162.

The excess fluid regulators are configured to direct excess fluid from the third fluid to the third fluid flow exploitation stream. The third fluid flow exploitation 144 stream is configured to provide for middle temperature air and water to the interior space 164.

The excess fluid regulators are configured to direct excess hot fluid from heating and hot water 160 to the reverse first fluid flow exploitation stream 141. The reverse first fluid flow exploitation stream is configured to convey the excess hot fluid to the first fluid reservoir 150;

The excess fluid regulators are configured to direct excess cool fluid from refrigeration and air conditioning 162 to the reverse second fluid flow exploitation stream 143. The reverse second fluid flow exploitation stream is configured to convey the excess cool fluid to the second fluid reservoir 152.

The excess fluid regulators are configured to direct excess middle temperature air and liquid 164 to the reverse second fluid flow exploitation stream 145. The reverse second fluid flow exploitation stream is configured to convey the excess cool fluid to the third fluid reservoir 154.

The first fluid reservoir 150 is configured to receive the first fluid and the excess hot fluid if electrical generation is not required by end users of the interior space climate control system and to convey the first fluid and the excess hot fluid to the first fluid conveyance inlet 130 if electrical generation is required.

The first fluid reservoir is configured to convey the first fluid and the excess hot fluid to the first fluid flow exploitation stream if electrical generation is not required but heating and hot water are required by end users of the interior space climate control system.

The second fluid reservoir is configured to convey the second fluid and excess cold fluid to the second fluid flow exploitation stream if electrical generation is not required but refrigeration or air condition is required.

The second fluid reservoir is configured to convey the second fluid and excess cold fluid to the second fluid conveyance inlet if electrical generation is required.

Fluid from the first, second, and third fluid outlets may be distributed amongst the fluid exploitation streams based on their temperature changes. Thus, if the first fluid has sufficiently cooled, instead of being conveyed from the first fluid outlet to the first fluid exploitation stream, would instead be conveyed to the second or third fluid exploitation stream. The determination would be made by the excess fluid regulators.

As mentioned, the excess fluid regulators can redirect stream flow based on data obtained from temperature, volumetric flow, and other sensors.

Figure 3:
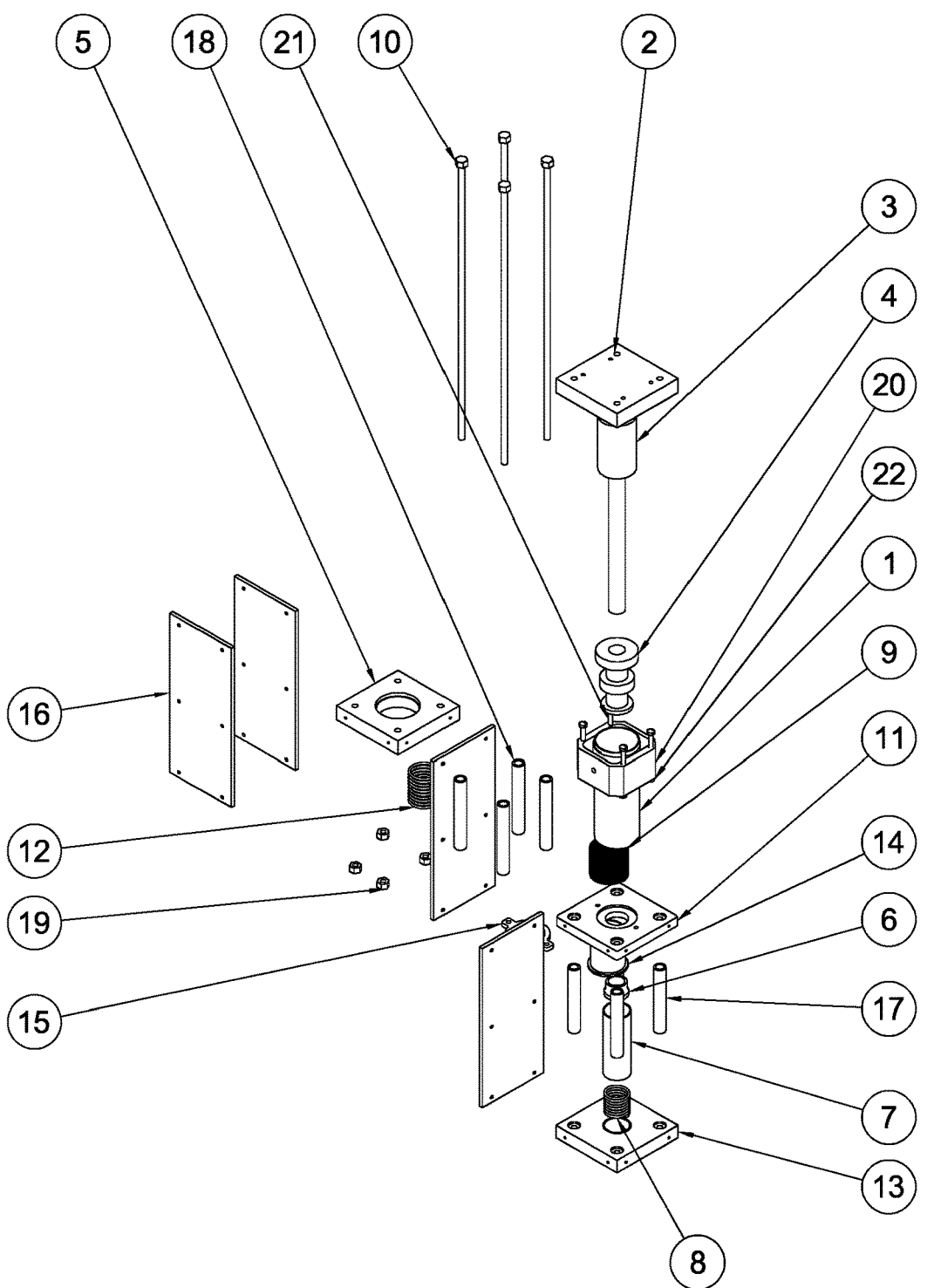
FIG. 3 shows an exemplary Stirling Engine.

As shown in FIG. 3, the Stirling Engine may comprise a working cylinder 1, a cylinder head 2, a displacer with a rod 3, a power piston with a rod neck 4, a cylinder base 5, a displacer spring plunger 6, a displacer spring sleeve 7, a displacer spring 8, an alternator coil 9, a set of big bolts 10, a spring stack clamp 11, a piston spring 12, a spring cylinder head 13, a piston spring sleeve 14, a piston spring sleeve retainer 15, a set of case side plates 16, a set of lower spring stack spacers 17, a set of upper spring stack spacers 18, a set of big nuts 19, a heat in collar 20, a set of screws 21, and a set of hex nuts 22.

Figure 4:
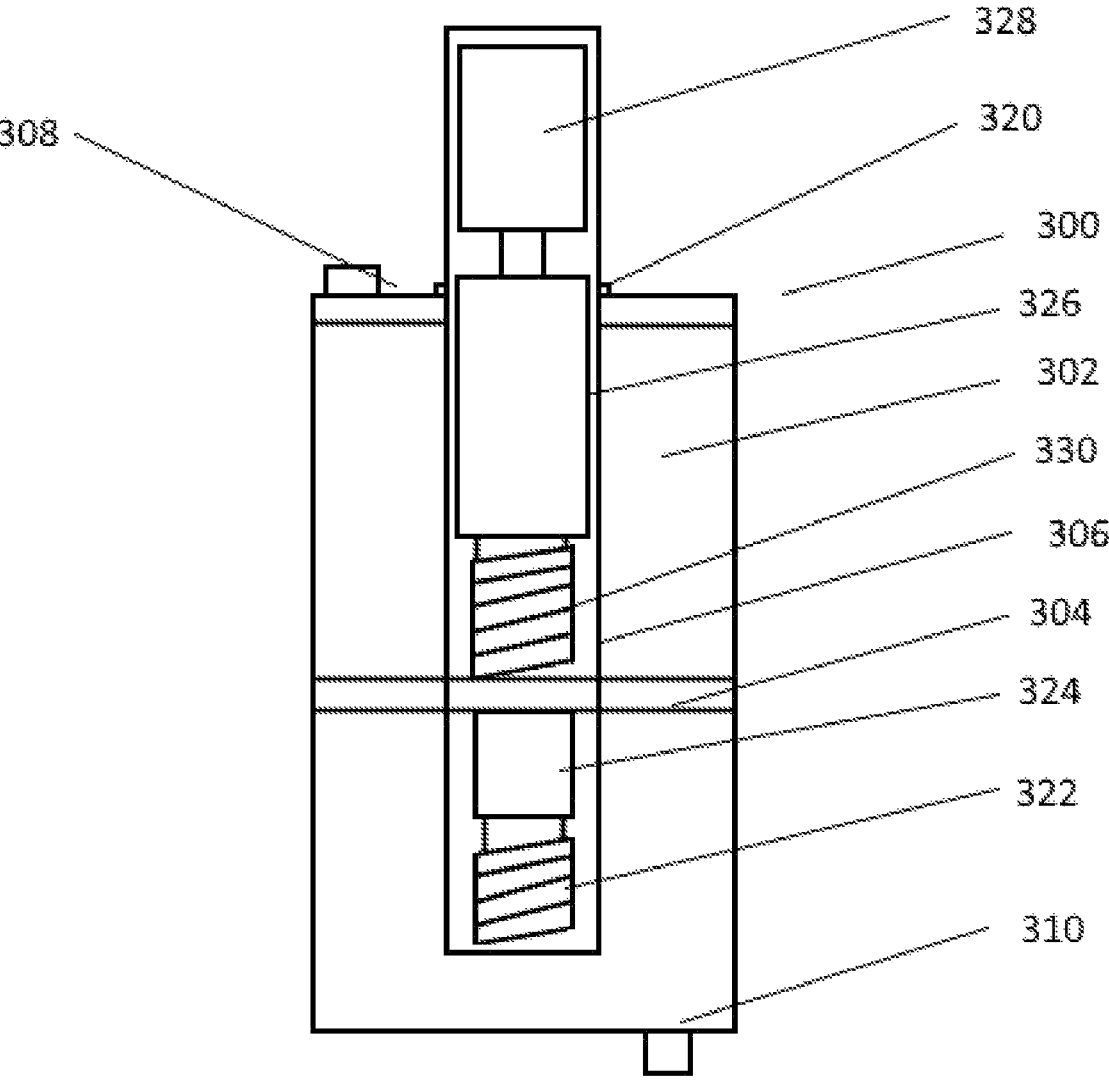
FIG. 4 shows an exemplary Stirling Engine.

As shown in FIG. 4, the Stirling engine 300 may comprise a cold immersion sink 302, which includes a cold immersion cavity 304, a piston sheath 306 disposed in the cold immersion cavity, an inlet providing conveyance of a fluid into the cold immersion cavity 308, and an outlet providing conveyance out of the cold immersion cavity 310. The inlet may be disposed on an upper portion of the cold immersion sink and the outlet may be disposed on a lower portion of the cold immersion sink. The inlet may receive a first fluid in an initially cold state, and the outlet may provide for conveyance of the first fluid out of the cold immersion sink. It is expected that the fluid will increase in temperature between its entry and exit of the cold immersion sink.

The cold immersion sink may also comprise a pass-through opening 320, through which the piston sheath passes through, out of, and above the cold immersion sink. The piston case may comprise a spring-loaded mechanism 322, a piston 324, and a hot sink 326. The piston sheath may further comprise a displacer 328, and a displacer spring 330. The piston and displacer may be configured to undergo reciprocating alternate cycles. The hot sink may comprise a coil-shaped conveyance slide, which wraps along an interior portion of the hot sink and around the piston, carrying a hot fluid.

The invention claimed is:

1. An interior space climate control system comprising a temperature differential engine, a first opposing temperature source, a second opposing temperature source, a third opposing temperature source, source sufficiency sensors, source regulators, excess fluid regulators, an electrical transmission line, a first fluid conveyance inlet, a first fluid conveyance outlet, a second fluid conveyance inlet, a second fluid conveyance outlet, a third fluid conveyance inlet, and a third fluid conveyance outlet, a first fluid flow exploitation stream, a reverse first fluid flow exploitation stream, a second fluid flow exploitation stream, a reverse second fluid flow exploitation stream, a first fluid reservoir, and a second fluid reservoir;

a. with the first fluid conveyance inlet configured to convey a first fluid from the first opposing temperature source into the temperature differential engine, the first fluid conveyance outlet configured to convey the first fluid out of the temperature differential engine;

b. with the second fluid conveyance inlet configured to convey a second fluid from the second opposing temperature source into the temperature differential engine, the second fluid conveyance outlet configured to convey the second fluid out of the temperature differential engine;

c. with the third fluid conveyance inlet configured to convey a third fluid from the third opposing temperature source into the temperature differential engine, the third fluid conveyance outlet configured to convey the third fluid out of the temperature differential engine;

d. with the temperature differential engine comprising a piston sheath, a piston and piston spring disposed within the piston sheath, a displacer and displacer spring disposed within the piston sheath, a coil tube configured to receive the first fluid, and an immersion sink configured to receive the second fluid, i. with the piston and displacer configured to undergo reciprocating alternative cycles;

ii. with the temperature differential engine configured to generate electricity using a temperature differential between fluid in the immersion sink and fluid in the coil tube and to transmit the generated electricity via the electrical transmission line;

e. with the source sufficiency sensors configured to determine if there is sufficient fluid flow or volume in the first or second opposing temperature sources;

f. with the source regulators configured to direct the third opposing temperature source to replace the first opposing temperature source if the source sufficiency detector determines that fluid flow in the first opposing temperature source is less than a given first fluid flow volumetric or temperature threshold;

g. with the source regulators configured to direct the third opposing temperature source to replace the second opposing temperature source if the source sufficiency detector determines that fluid flow in the second opposing temperature source is less than a given second fluid flow volumetric threshold or greater than a given second fluid flow temperature threshold;

h. with the excess fluid regulators configured to direct excess fluid from the first fluid to the first fluid flow exploitation stream, with the first fluid flow exploitation stream providing fluid for heating and hot water in an interior space;

i. with the excess fluid regulators configured to direct excess fluid from the second fluid to the second fluid flow exploitation stream, with the second fluid flow exploitation stream providing cooling fluid for use in refrigeration and air conditioning;

j. with the excess fluid regulators configured to direct excess hot fluid from heating and hot water to the reverse first fluid flow exploitation stream, with the reverse first fluid flow exploitation stream configured to convey the excess hot fluid to the first fluid reservoir;

k. with the excess fluid regulators configured to direct excess cool fluid from refrigeration and air conditioning to the reverse second fluid flow exploitation stream, with the reverse second fluid flow exploitation stream configured to convey the excess cool fluid to the second fluid reservoir;

l. with the first opposing temperature source being liquid heated via a solar heat collector;

i. with the solar heat collector comprising an exposure vessel, with the exposure vessel configured to expose the liquid to sunlight to receive solar radiation;

ii. with the solar heat collector configured to convey the liquid to the first fluid flow conveyance inlet;

m. with the second opposing temperature source being fluid from a geothermal well, with the geothermal well being disposed underground;

n. with the third opposing temperature source being ambient above-ground air;

o. with the source regulators and the excess fluid regulators each comprising set of valves for controlling fluid flow;

p. with the first fluid reservoir configured to receive the first fluid and the excess hot fluid if electrical generation is not required by end users of the interior space climate control system and to convey the first fluid and the excess hot fluid to the first fluid conveyance inlet if electrical generation is required;

q. with the first fluid reservoir configured to convey the first fluid and the excess hot fluid to the first fluid flow exploitation stream if electrical generation is not required but heating and hot water are required by end users of the interior space climate control system;

r. with the second fluid reservoir configured to convey the second fluid and excess cold fluid to the second fluid flow exploitation stream if electrical generation is not required but refrigeration or air condition is required;

s. with the second fluid reservoir configured to convey the second fluid and excess cold fluid to the second fluid conveyance inlet if electrical generation is required.

2. An interior space climate control system comprising a temperature differential engine, a first opposing temperature source, a second opposing temperature source, an electrical transmission line, excess fluid regulators, a first fluid conveyance inlet, a first fluid conveyance outlet, a second fluid conveyance inlet, a second fluid conveyance outlet, a first fluid flow exploitation stream, a second fluid flow exploitation stream, a first fluid reservoir, and a second fluid reservoir;

a. with the first fluid conveyance inlet configured to convey a first fluid from the first opposing temperature source into the temperature differential engine, the first fluid conveyance outlet configured to convey the first fluid out of the temperature differential engine;

b. with the second fluid conveyance inlet configured to convey a second fluid from the second opposing temperature source into the temperature differential engine, the second fluid conveyance outlet configured to convey the second fluid out of the temperature differential engine;

c. with the temperature differential engine configured to generate electricity using a temperature differential between fluids;

d. with the excess fluid regulators configured to direct excess fluid from the first fluid to the first fluid flow exploitation stream, with the first fluid flow exploitation stream providing fluid for heating and hot water in an interior space;

e. with the excess fluid regulators configured to direct excess fluid from the second fluid to the second fluid flow exploitation stream, with the second fluid flow exploitation stream providing cooling fluid for use in refrigeration and air conditioning;

f. with the first opposing temperature source being liquid heated via a solar heat collector;

i. with the solar heat collector comprising an exposure vessel, with the exposure vessel configured to expose the liquid to sunlight to receive solar radiation;

ii. with the solar heat collector configured to convey the liquid to the first fluid flow conveyance inlet;

g. with the second opposing temperature source being fluid from a geothermal well, with the geothermal well being disposed underground.

3. The interior space climate control system in claim 2, additionally comprising a third opposing temperature source, a third fluid conveyance inlet, and a third fluid conveyance outlet, with the third fluid conveyance inlet configured to convey a third fluid from the third opposing temperature source into the temperature differential engine, the third fluid conveyance outlet configured to convey the third fluid out of the temperature differential engine.

4. The interior space climate control system in claim 2, with the temperature differential engine comprising a piston sheath, a piston and piston spring disposed within the piston sheath, a displacer and displacer spring disposed within the piston sheath, a coil tube configured to receive the first fluid, and an immersion sink configured to receive the second fluid, a. with the piston and displacer configured to undergo reciprocating alternative cycles;

b. with the temperature differential engine configured to generate electricity using a temperature differential between fluid in the immersion sink and fluid in the coil tube and to transmit the generated electricity via the electrical transmission line.

5. The interior space climate control system in claim 3, with the system additionally comprising source sufficiency sensors and source regulators, a. with the source sufficiency sensors configured to determine if there is sufficient fluid flow or volume in the first or second opposing temperature sources;

b. with the source regulators configured to direct the third opposing temperature source to replace the first opposing temperature source if the source sufficiency detector determines that fluid flow in the first opposing temperature source is less than a given first fluid flow volumetric or temperature threshold;

c. with the source regulators configured to direct the third opposing temperature source to replace the second opposing temperature source if the source sufficiency detector determines that fluid flow in the second opposing temperature source is less than a given second fluid flow volumetric threshold or greater than a given second fluid flow temperature threshold.

6. The interior space climate control system in claim 3, with the third opposing temperature source being ambient above-ground air.

7. The interior space climate control system in claim 2, with the system additionally comprising a reverse first fluid flow exploitation stream;

a. with the excess fluid regulators configured to direct excess hot fluid from heating and hot water to the reverse first fluid flow exploitation stream, with the reverse first fluid flow exploitation stream configured to convey the excess hot fluid to the first fluid reservoir.

8. The interior space climate control system in claim 2, with the system additionally comprising a reverse second fluid flow exploitation stream, with the excess fluid regulators configured to direct excess cool fluid from refrigeration and air conditioning to the reverse second fluid flow exploitation stream, with the reverse second fluid flow exploitation stream configured to convey the excess cool fluid to the second fluid reservoir.

9. The interior space climate control system in claim 7, with the first fluid reservoir configured to receive the excess hot fluid if electrical generation is not required by end users of the interior space climate control system.

10. The interior space climate control system in claim 7, with the first fluid reservoir configured to convey the excess hot fluid to the first fluid conveyance inlet if electrical generation is required.

11. The interior space climate control system in claim 8, with the second fluid reservoir configured to convey the excess cold fluid to the second fluid conveyance inlet if electrical generation is required.

12. The interior space climate control system in claim 8, with the second fluid reservoir configured to convey the second fluid to the second fluid flow exploitation stream if electrical generation is not required but refrigeration or air condition is required.

13. The interior space climate control system in claim 8, with the second fluid reservoir configured to convey the second fluid to the second fluid conveyance inlet if electrical generation is required.

14. An interior space climate control system comprising a temperature differential engine, a first opposing temperature source, a second opposing temperature source, an electrical transmission line, excess fluid regulators, a first fluid conveyance inlet, a first fluid conveyance outlet, a second fluid conveyance inlet, a second fluid conveyance outlet, a first fluid flow exploitation stream, a second fluid flow exploitation stream;

a. with the first fluid conveyance inlet configured to convey a first fluid from the first opposing temperature source into the temperature differential engine, the first fluid conveyance outlet configured to convey the first fluid out of the temperature differential engine;

b. with the second fluid conveyance inlet configured to convey a second fluid from the second opposing temperature source into the temperature differential engine, the second fluid conveyance outlet configured to convey the second fluid out of the temperature differential engine;

c. with the temperature differential engine configured to generate electricity using a temperature differential between fluids;

d. with the excess fluid regulators configured to direct excess fluid from the first fluid to the first fluid flow exploitation stream, with the first fluid flow exploitation stream providing fluid for heating or hot water in an interior space;

e. with the excess fluid regulators configured to direct excess fluid from the second fluid to the second fluid flow exploitation stream, with the second fluid flow exploitation stream providing cooling fluid for use in refrigeration or air conditioning.

15. The interior space climate control system of claim 14, a. with the first opposing temperature source being liquid heated via a solar heat collector;

i. with the solar heat collector comprising an exposure vessel, with the exposure vessel configured to expose the liquid to sunlight to receive solar radiation;

ii. with the solar heat collector configured to convey the liquid to the first fluid flow conveyance inlet.

16. The interior space climate control system of claim 14, with the second opposing temperature source being fluid from a geothermal well, with the geothermal well being disposed underground.

17. The interior space climate control system in claim 14, with the temperature differential engine comprising a piston sheath, a piston and piston spring disposed within the piston sheath, a displacer and displacer spring disposed within the piston sheath, a coil tube configured to receive the first fluid, and an immersion sink configured to receive the second fluid, a. with the piston and displacer configured to undergo reciprocating alternative cycles;

b. with the temperature differential engine configured to generate electricity using a temperature differential between fluid in the immersion sink and fluid in the coil tube and to transmit the generated electricity via the electrical transmission line.

18. The interior space climate control system in claim 14, with the system additionally comprising a reverse first fluid flow exploitation stream;

a. with the excess fluid regulators configured to direct excess hot fluid from heating and hot water to the reverse first fluid flow exploitation stream, with the reverse first fluid flow exploitation stream configured to convey the excess hot fluid to the first fluid conveyance inlet.

19. The interior space climate control system in claim 14, with the system additionally comprising a reverse second fluid flow exploitation stream;

a. with the excess fluid regulators configured to direct excess cool fluid from refrigeration and air conditioning to the reverse second fluid flow exploitation stream, with the reverse second fluid flow exploitation stream configured to convey the excess cool fluid to the second fluid conveyance inlet.

20. The interior space climate control system in claim 14, additionally comprising a third opposing temperature source, a third fluid conveyance inlet, a third fluid conveyance outlet, source sufficiency sensors and source regulators, a. with the third fluid conveyance inlet configured to convey a third fluid from the third opposing temperature source into the temperature differential engine, the third fluid conveyance outlet configured to convey the third fluid out of the temperature differential engine;

b. with the source sufficiency sensors configured to determine if there is sufficient fluid flow or volume in the first or second opposing temperature sources;

c. with the source regulators configured to direct the third opposing temperature source to replace the first opposing temperature source if the source sufficiency detector determines that fluid flow in the first opposing temperature source is less than a given first fluid flow volumetric or temperature threshold;

d. with the source regulators configured to direct the third opposing temperature source to replace the second opposing temperature source if the source sufficiency detector determines that fluid flow in the second opposing temperature source is less than a given second fluid flow volumetric threshold or greater than a given second fluid flow temperature threshold.

\* \* \* \* \*